(12) United States Patent
Almeida

(10) Patent No.: US 8,402,163 B2
(45) Date of Patent: Mar. 19, 2013

(54) TARGET ADVERTISING TO A SPECIFIC USER OFFERED THROUGH AN INTERMEDIARY INTERNET SERVICE PROVIDER, SERVER OR WIRELESS NETWORK

(76) Inventor: John Almeida, Richmond, CA (US)

( * ) Notice: Subject to any disclaimer, the term of this patent is extended or adjusted under 35 U.S.C. 154(b) by 253 days.

(21) Appl. No.: 12/834,103

(22) Filed: Jul. 12, 2010

(65) Prior Publication Data
US 2010/0281041 A1    Nov. 4, 2010

Related U.S. Application Data

(63) Continuation-in-part of application No. 11/677,224, filed on Feb. 21, 2007, now abandoned.

(51) Int. Cl.
*G06F 15/173* (2006.01)
(52) U.S. Cl. ........ 709/238; 709/217; 709/218; 709/219; 709/223; 709/225
(58) Field of Classification Search .................. 709/217, 709/218, 219, 223, 225, 238
See application file for complete search history.

(56) References Cited

U.S. PATENT DOCUMENTS

| | | | |
|---|---|---|---|
| 6,134,532 A | | 10/2000 | Lazarus et al. |
| 6,339,761 B1 * | | 1/2002 | Cottingham ............... 705/14.66 |
| 7,289,964 B1 * | | 10/2007 | Bowman-Amuah ........... 705/1.1 |
| 7,899,915 B2 * | | 3/2011 | Reisman ........................ 709/228 |
| 7,987,491 B2 * | | 7/2011 | Reisman ........................ 725/112 |
| 2002/0072952 A1 | | 6/2002 | Hamzy et al. |
| 2003/0229900 A1 * | | 12/2003 | Reisman ......................... 725/87 |
| 2004/0102197 A1 | | 5/2004 | Dietz |
| 2006/0149734 A1 * | | 7/2006 | Egnor et al. ...................... 707/7 |
| 2006/0212350 A1 * | | 9/2006 | Ellis et al. ....................... 705/14 |
| 2006/0253583 A1 * | | 11/2006 | Dixon et al. .................. 709/225 |
| 2008/0183687 A1 * | | 7/2008 | Law ................................ 707/4 |
| 2010/0293221 A1 * | | 11/2010 | Sidman et al. ................ 709/203 |

OTHER PUBLICATIONS

Office action on U.S. Appl. No. 11/677,224, Aug. 6, 2009.
Office action on U.S. Appl. No. 11/677,224, Mar. 12, 2010.

* cited by examiner

*Primary Examiner* — Liangche A Wang
(74) *Attorney, Agent, or Firm* — Louis Ventre, Jr.

(57) ABSTRACT

An advertising method controls the display of information on a client device. A user accesses first content on a server and a first link reference to second content is created. The first content and the first link reference are displayed in separate areas. User interaction with the first link reference sends second content to replace the first content on the content display area of the client computer. The second content includes a second link reference which can redirect the user to the hosting location of the second content. The server may operate as a wireless node. The first content is optionally parsed to key words or objects and the parsed content is used to identify the second content. Optionally, receiving data from a user's wireless device relates to user location; and, the location data is used to identify the second content.

6 Claims, 11 Drawing Sheets

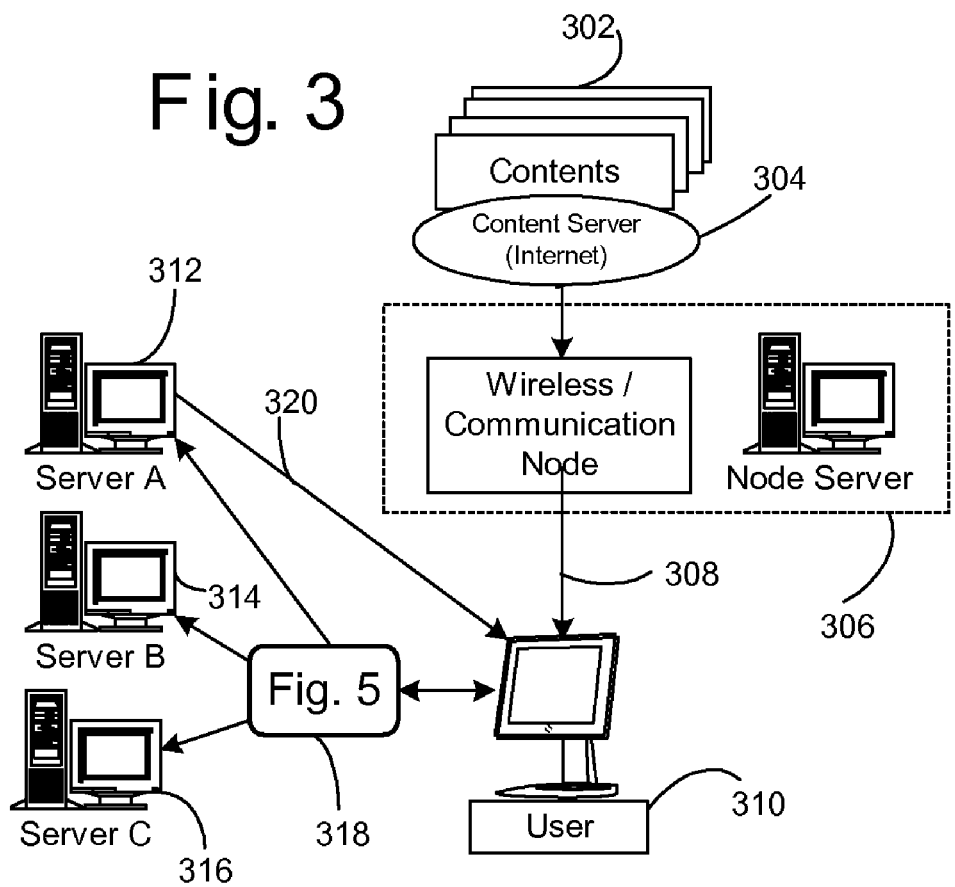
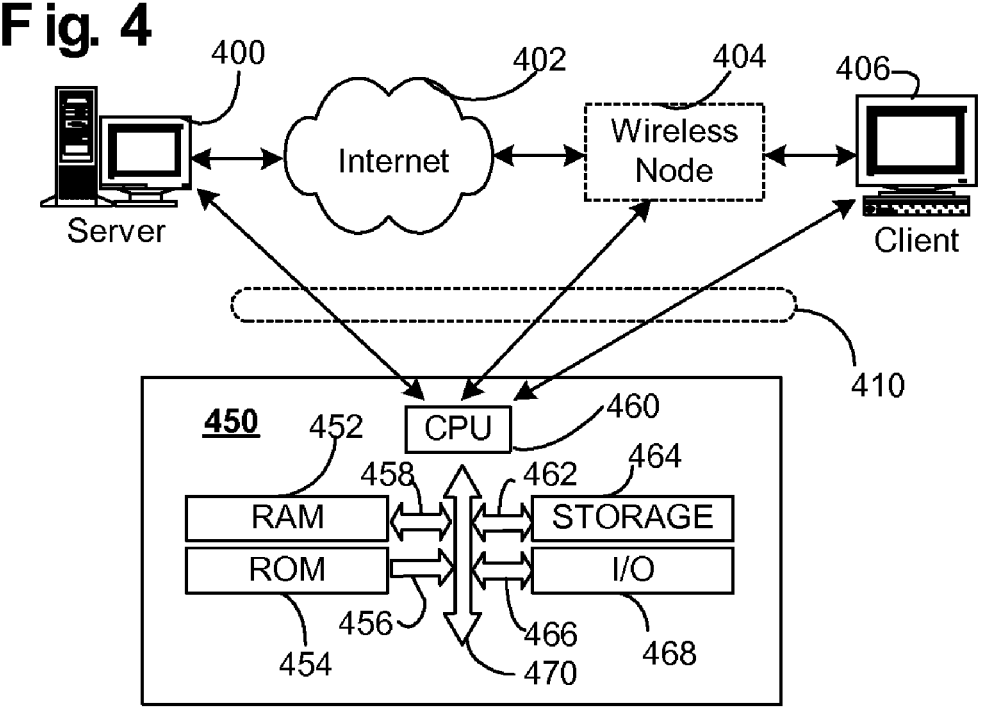

TARGET ADVERTISING TO A SPECIFIC USER OFFERED THROUGH AN INTERMEDIARY INTERNET SERVICE PROVIDER, SERVER OR WIRELESS NETWORK

CROSS-REFERENCE TO RELATED APPLICATIONS

This application is a continuation-in-part of application Ser. No. 11/677,224, filed 21 Feb. 2007, which is hereby incorporated by reference herein.

TECHNICAL FIELD

In the field of data processing: financial, business practice, management, or cost/price determination, a method is disclosed for promoting or calling to the attention of the public to goods or services to induce the public to buy or use the goods or services. The method is implemented by targeting advertisements to users through an Internet Service Provider and by supplying related content influenced by a user-visited webpage, a user-visited website, a user-profile, previously-viewed content, user surfing-history and a wireless node's demographic data.

BACKGROUND ART

U.S. Pat. No. 6,339,761 (the '761 patent) teaches a method for providing advertises to Internet Service Providers (Internet Service Provider) where the Internet Service Provider has precise control over who receives an advertisement. Thus, in accordance with the '761 patent, an Internet Service Provider may offer advertisers precision advertising, since an Internet Service Provider has access to precise demographic data on each of the Internet Service Provider's customers.

The '761 patent discloses that the Internet Service Provider has access to data on the periods of usage, including the type of customers accessing the Internet during such periods of usage. By using this information, one may target advertisements to a precise audience. The '761 patent teaches the insertion of an advertising into a web page by the Internet Service Provider, or, the removal of an advertisement from a webpage by the Internet Service Provider and the insertion of substitute Internet Service Provider advertising.

SUMMARY OF INVENTION

A method is disclosed for targeting advertising to a user operating a client computer accessing a server computer through an Internet Service Provider or a wireless node. The term client computer is broadly defined to include a desktop computer, a laptop computer, or any of the variety of hand-held wireless computing devices now available, such as a variety of cellular telephones.

The server computer implements steps of hosting a first content on the server computer; enabling the client computer to access the server computer; creating a first link reference to second content; formatting the first content and the first link reference for display on the client computer wherein said formatting will display the first link reference in a: link display area that is separated from the first content that will display in a content display area; in a style that is indicative that other additional related content is available to the user; and in a configuration involving one of a tab; a link; a bar; a floating bar; a browser bar; a user downloaded bar; and a menu. The server computer then implements steps of transmitting the formatted first content and the first link reference to the client computer; responding to user interaction with the first link reference by sending the second content to replace the first content on the content display area of the client computer; the second content comprising a second link reference; and, redirecting the user to the hosting location of the second content when the user clicks on the second link reference.

Preferably, the method includes parsing the first content into key words or objects and then using the parsed content to identify related second content before creating the link.

Content displayed to a user is preferably indexed by an Indexing Server (Index Server), which may be the sever computer, at anytime (before the content is viewed by the user, while the user is viewing the content, or after the user views the content). The Indexing Server may then supply content to the user based on a previous user's interaction with the Internet Service Provider, such as, previously stated preferences, a similarity with previously viewed content, user's surf history, etc.

Wireless nodes may be used in the method, either by connecting the server computer to the wireless node or by integrating the wireless node into the server computer. The client computer or other user device may then connect to the server computer through the wireless node.

Technical Problem

Although The '761 patent teaches a method for targeting advertisements to a specific audience, it fails to teach a comprehensive way of targeting advertising or content to a specific audience without noticeable intrusions. The '761 patent teaches the insertion of advertisements web pages as users traffic through the Internet Service Provider. The '761 patent also teaches, in many cases, removing advertisements that are already rendered into the webpage. Such advertisement substitution can lead to copyright infringement by changing the contents of webpage without the consent of the content preparer or owner. The '761 patent may be problematic because it teaches changing advertisements that are already rendered into a webpage and this may lead to a false sense on the part of the user as to the sponsorship or legitimacy of the content. Thus, the '761 patent raises questions about the legality and ethical value of the advertising method disclosed.

The prior art where a user accesses a wireless node the user's receiving device receives some data from the wireless node and the receiving device displays the received data as a list of available devices in the range of the user's receiving device. Some wireless nodes may require the user a login and the user's receiving device asks the user for the login then transmits it to the wireless node as to authorize the user use of the wireless node. Still wireless companies like Sprint, ATT and others transmit text that are hosted by their servers to their users base, but the transmission is not directed to a wireless node per se, it is directed to a group of cellular-exchange nodes then the cellular-exchange node that is closest to the recipient device transmit the text-content to the user at the device. In the aforementioned case involving wireless companies, the signal travels from the wireless company's server to the a satellite then to the wireless cellular-exchange node, then from the cellular-exchange node to the receiving device, or, it may travel to one or more cellular-exchange node until it reaches the recipient device, this process happens if the transmitting device and the receiving device are within an area where satellite transmission is not necessary.

Solution to Problem

The solution is a method for targeting advertising to a user operating a client computer by transmitting requested content and related link references for separate display on the client computer. An Internet Service Provider supplies content related to a user-visited webpage, a user-visited website, a user profile, previously-viewed content, user surfing history, and wireless node's demography data. An Indexing Server works in harmony with the Internet Service Provider as to provide related content to the user and based on user's previously viewed contents, user's surfing history and user's profile. A wireless node working alone or in harmony with another server provides to a user additional contents and based on the wireless node's contents choice.

Advantageous Effects of Invention

The present invention advantageously provides content and related advertising to a user through an Internet Service Provider or a wireless service provider. The advertising is targeted to specific audience and is relevant to some interest of the user. For example, the advertising is based on some relationship between the user's previously viewed contents and advertisings, the user's profile, the user's surfing-history, wireless node's demography data, or the user's previously-viewed content's relationship with other content. The present invention further avoids any legality issues and cannot engender a false sense of content legitimacy. The term advertising and content are used interchangeably herein.

Currently, wireless nodes are passive in nature acting more as a communication link routing contents from a server to a client. The only time that a wireless node acts as an active device is when it transmits its identification to receiving devices. However, wireless node may be enhanced and be used as both passive and active devices. Since many devices (portable and non-portable) in use today have the ability to access wireless nodes anywhere, and if wireless nodes are enhanced according to the invention to become active in nature, then this would allow a wide range of software applications and business solutions to be developed and deployed.

The invention enables the wireless node to take on a new function to become an active device by transmitting to a client computer or other user receiving device information beyond the simple identification that it currently does.

One major advantage of the present invention is that it will enable a computer connected to the wireless node do become a server to the wireless node where a complete content page in the format used by Internet (HTML) format or any other format or it may provide a snapshot of the actual content, this way the user receiving device may display snapshot of a plurality of contents from a plurality of wireless nodes in the reach and it may be just a list of all the contents' snapshot with a brief description of each. Further, the present invention involves the computer acting as a host and being connected to the wireless node (wireless box) located to the proximity of the hosting computer, it may be located at a home, at an office or at a wireless range between the hosting computer and the wireless node device.

Any wireless device that may be programmed to transmit its own data (data related to the device like longitude, latitude and keywords describing the device or even a complete content page in any conceivable format) or to transmit the device enabled information, such as, location information, the method may then involve sending related store information to the wireless device.

The wireless-hosting computer combination will enable new industries by making a once inactive device an active one and doing all kind of hosting activities. New industries like programming to these devices as a platform and target advertisements (contents) to each device and user, enabling business to advertise to the general public located in the general area within reach of its wireless node and thus bring more business, generate more income and create more jobs.

The invention makes wireless nodes active and promotes free Internet access to all using the already available wireless nodes by enabling the wireless node's owner to receive compensation for its free use. The invention also encourages free or very low cost wireless devices to everyone because it provides a means for wireless node's manufacturers to be compensated with commissions.

One great improvement of the present invention over other presently available prior art is that each element may be incorporated as a standalone or each cooperating with others to enable a broader applicability that may not be possible with a single standalone element. For instance, the indexing server may be used as a search engine server cooperating with an Internet Service Provider, as well cooperating with wireless devices—receivers and transmitters (node).

The Internet Service Provider of the present invention offers advantageous improvement over others Internet Service Provider servers since it is able to directly cooperate with the Indexing Server and wireless devices, a further advantage is that the Internet Service Provider server, the Indexing Server, wireless devices or wireless-server devices of the present invention are able to associate other contents to the contents being served without interfering with content's integrity by making related contents available to the receiving device's external elements like a bar, a tab at the browser, a floating bar, an icon on the browser's task bar, or user's bar, icon on the bar, etc. If the browser bar is used, a bar may be programmed where JAVASCRIPT or other technology may be used to present a new bar or to add icons/links to an already existing bar, the programming code may be sent to the client by the Internet Service Provider server or any other server or means.

By having this mechanism, the Internet Service Provider can control the user's content that are served to the user and at a later visit place on the external element similar contents that are of importance to the user.

A further advantage of the present invention over currently available prior art is that the user will have a greater content availability related to the user's interest by having the Internet Service Provider associating relevant content to the user. It may be setup where the user opts out and the Internet Service Provider won't serve content to the user if opted out, as well the user can choose the kind of content that the Internet Service Provider server will associate with the user's contents. It can further be setup where the user is registered with the Internet Service Provider, the Indexing Server or registered in one and the user's information shared between the Internet Service Provider, Indexing Server, even the wireless devices or the wireless-server combination.

Other advantageous uses of the present invention include enabling wireless nodes to be programmed, transforming them from a passive to active devices. New industries will be incentivized to emerge and make use of the present invention. These new smart wireless devices become a platform much like smart cell phones are today. Furthermore, with the combination of smart-active wireless devices, nodes and transceivers a new industry will emerge in the arena of wireless communication such as, new smart software for the devices and new communication applications where the once upon a time inactive devices become smart active devices and programmable platform.

The invention creates a new advertising medium where consumers will access the medium from almost anywhere the consumers are located. Currently technologies enable business to target content, advertising in particular, based on the user accessing a specific website and the website may target content to the user based on the user profile. The present invention eliminates current technology's need for a user to be registered with the website and employs other means to target content based on the user's smart device by using the smart device's GPS as a means to identify the user's location.

The present invention has advantage by providing a simple, efficient and economic means where the business may target the content based on wireless devices and the content will be much more cost effective to the business. Further, anyone with the present invention will be incentivized by commissions to offer free access to others. Thus generating a new income stream in the process of promoting free Internet access to the general population. A practical example of this advantage involves a building with apartments for rent. A potential renter located in the area where the building is located may immediately access the available apartments for rent. The renter need not first visit a website and search for the information, which may or may not be up to date or may or may not be on available. Any building owner using the invention would incur no unnecessary advertising expenses on websites, but would rather be focused only on high interest customers already in the area.

The present invention may be used to enable a wireless device to become the hosting of third party content like friends, family, individuals or business in the general area where the device is located. It enables each wireless device to offer means where users can register and login to provide content thereto, contents may be provided thereto by the Indexing Server, Internet Service Provider server or any other server that the wireless device is connected with, is able to communicate and receive data from or send data to.

The contents to such wireless devices may be user supplied or supplied by accessing the devices (login in to the device or not) or supplied by another server that the device communicates with, like a server over the Internet/Network. In this arrangement, a once inactive device of the prior art becomes a new smart device where its owner can make money by hosting other's content or allowing others to provide content thereto. The invention thus creates smart wireless devices to a viable platform for expanded communication and a new industry where many new income streams are generated by these new smart wireless devices.

The owners of these new smart wireless devices can have income stream in sales of goods or services, advertisings, and many other methods to be conceived by the human mind. Furthermore, a wireless device may be used to send information to other servers where it is connect with through the Internet/Network, for instance the device may send its content to a host at another location on the Internet/Network or even send it to another wireless device.

The programs to be used by the new smart-wireless devices may be downloaded from a server, another smart-wireless device or any other storage device. Any such downloaded software application may be automatically incorporated and executed by the new smart-wireless device platform.

BRIEF DESCRIPTION OF DRAWINGS

The accompanying drawings, which are incorporated herein, illustrate embodiments of the invention, and together with the description, serve to explain the principles of the invention.

FIG. 3 illustrates another preferred embodiment in which a wireless node will present on the web browser a means for a user to select contents based on the wireless node's preferences.

FIG. 4 illustrates client/server communication over the Internet/Network and an electronic representation of a computing device.

DESCRIPTION OF EMBODIMENTS

Figure 1:
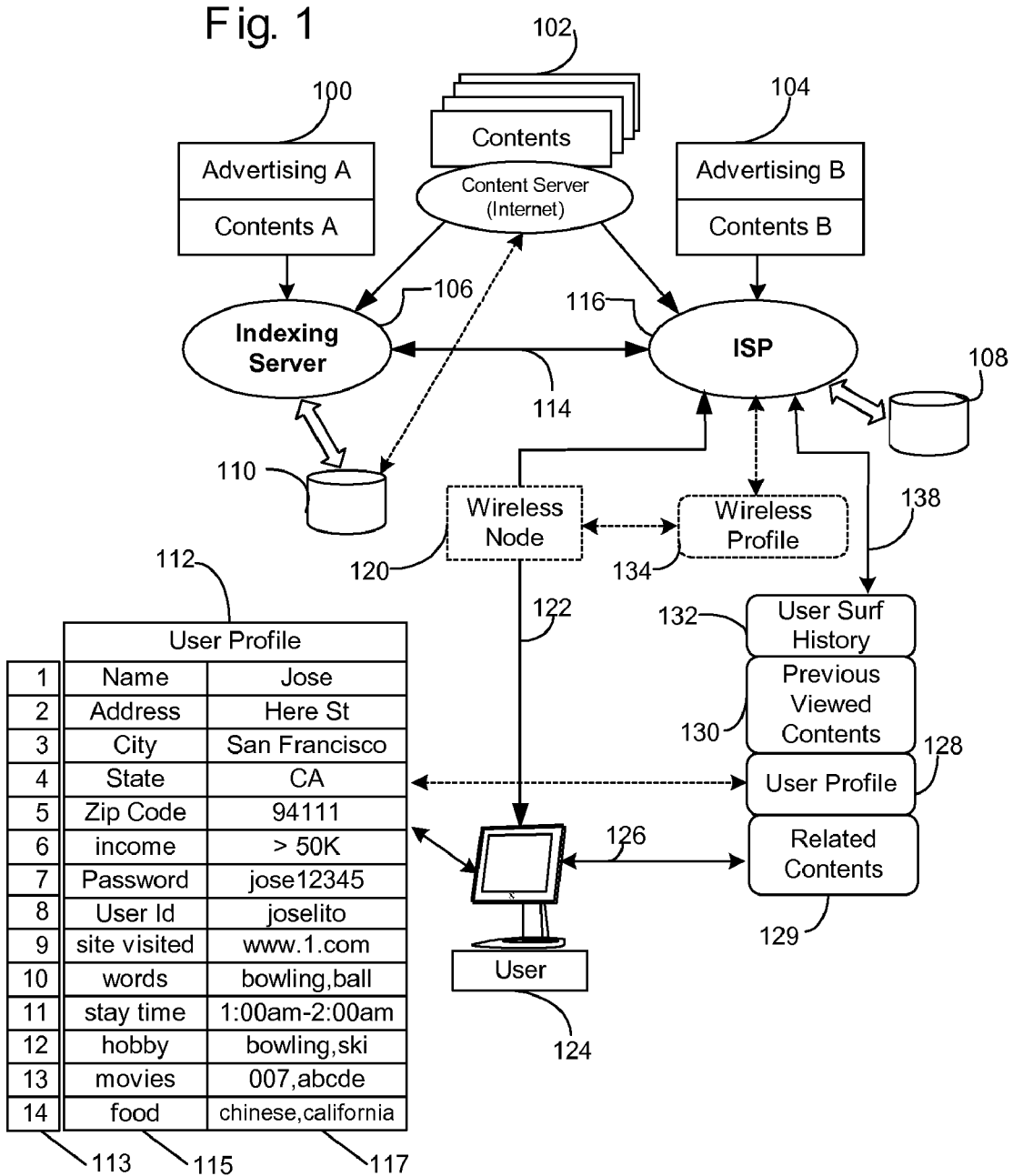
FIG. 1 illustrates a preferred embodiment of this invention in which an Indexing Server and Internet Service Provider works in harmony to supply content to a user.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention may be embodied as a method or a computer program product. Accordingly, the present invention may take a form of an entirely software embodiment or an embodiment combining software and hardware. Furthermore, the present invention may take the form of a computer program product on a computer-readable storage medium having computer-readable program code means embodied in the medium. Any computer readable medium may be utilized including but not limited to: hard disks, CD-ROMs, optical storage devices, or magnetic devices.

Any reference to names of a product or of a company is only for the purpose of clarifying the discussion with a specific example in the context of current art and is not intended to be limiting.

In a preferred embodiment, the present invention provides a method for enabling an Index Server (also referred to as a server computer) and an Internet Service Provider operating the server computer to work in harmony or independently to provide related and targeted content to a user accessing content via the Internet through the Internet Service Provider. The invention is thus preferably characterized as a method implemented by a server computer and used for controlling the display of information on a client computer operated by a user.

Preferably, the Index Server or server computer hosts a first content on the server computer that may be accessed by the user. Thus, the server computer enables the user's client computer to access the server computer and the first content.

The server computer creates a first link reference to second content, also known as targeted content, which is identified by the server computer based on the user's previously visited contents or other relationships. The targeted content may be any kind of content, advertisings, video, audio, news, weather, etc.; preferably the targeted content is hosted by the Internet Service Provider and has it saved in the Index Server's database.

When a user accesses content through the Internet Service Provider, the Internet Service Provider associates the user's previously accessed contents with targeted content indexed by the Index Server. The Index Server may be located at the same site as the Internet Service Provider or in a separate site, separate URL (Universal Resource Locators) address. If the Index Server is located at a location other than the Internet Service Provider's location, the Index Server is, or will act similar to a search engine portal, e.g., GOOGLE, YAHOO, MSN, etc.

Upon user access, the server computer begins by formatting the first content and the first link reference for display on the client computer. The formatting will display the first link reference in a link display area that is separated from the first content that will display in a content display area in a style that is indicative that other additional related content is available to the user. The formatting will display the first link reference in a configuration selected from the group consisting of a tab; a link; a bar; a floating bar; a browser bar; a user downloaded bar; and a menu. Once formatted, the server computer transmits the formatted first content and the first link reference to the client computer.

Some or all of the contents accessed by a user may be indexed at the Index Server, preferably at the time the user is accessing content through the Internet Service Provider.

The Internet Service Provider or the Index Server may also parse the contents and save their objects (words, links, bold, italics, titles, etc.), and they will be objects of previously viewed contents, then at a later time once a user requests additional contents from the Internet Service Provider, Index Server, or any other server associated with the Internet Service Provider, the associated server, or the Internet Service Provider will provide contents and they will be based on the user's previously viewed contents objects (contents the user is viewing in the current session or a previous session), user's profile data, user's surf history, user's previously viewed content, and, if the user is accessing the Internet Service Provider through a wireless node link, the wireless topographical data (wireless's address location, zip code, city, longitude and latitude locations, etc.), data hosted by the smart-wireless device or hosted by the computer connected to the smart-wireless device node may be used as well.

If the data is hosted by the smart-wireless device node or hosted by the computer connected to the smart-wireless device node, the indexing server, the smart-wireless device node's computer, the computer connected to the smart-wireless device node, the ISP server, the login server or any other associated electronic device may index/parse the content, search the content's object or associate advertising and other contents to the content as needed before presenting the content to the smart-wireless device, at the time the content is being presented to the smart-wireless device node or after the content has been already presented to the smart-wireless device node.

User's profiling data may be any data pertinent to the user, including but not limited to: income, sex, age, hobbies, marital status, etc., and previous viewed contents may be any content in any category, including but not limited to: video, audio, advertisings, web pages, web sites, wireless nodes visited by the user, previous purchases of goods done by the user, user hobby, etc.

If such wireless node is used, the method of the invention may include a step of configuring the server computer to connect to the wireless node, or a step of integrating the server computer and the wireless node into a single unit. Additional steps may include receiving data from a user's wireless device relating to user location; and, using the data to identify the second content for display by the user's wireless device.

Thus, the method of the invention preferably includes steps of parsing the first content into parsed content comprising key words or objects; and using the parsed content to identify the second content before creating the link, such that the second content is based on a relationship to the parsed content. This relationship is preferably at least one of the following: a previously viewed content; a common word between the first and the second content; a user preference; a common category between the first and the second content; user personal information; user profiling information; location information; surf history; user hobby; user address information; a similar word between the first and the second content; a partial matching word between the first and the second content; a full matching word between the first and the second content; a synonymous word between the first and the second content; a homophone of a word in the first content; an advertisement containing any of the key words or objects; commonality with a user-supplied content having a relationship with the first content; and, a defined interest of the user.

Once a user receives a page through the Internet Service Provider, the Internet Service Provider may insert some kind of link, bar, floating bar links, tabs, etc., to indicate to the user that other contents (second contents) are available as well (contents based on the user's previously viewed contents objects, user's profile data, user's surf history, user's previously viewed content, etc.). The server computer responds to user interaction with the first link reference by sending the second content to replace the first content on the content display area of the client computer. The second content preferably includes a second link reference, which when clicked on by the user redirects the user to the hosting location of the second content.

Thus, once the user clicks on a second link reference, the user is directed to the Internet Service Provider, Index Server, or any accessible location through the Internet Service Provider, any of which such accessible location is referred to as an "associated server." Additional content will be provided by one or more such locations. Any of the associated servers (e.g.

Index Server, Internet Service Provider, other servers, etc.) will be able to share any or all information regarding the user accessing the Internet through the Internet Service Provider so as to enable the provision of appropriate targeted content to the user.

When a user accesses the Internet through a wireless node or any kind of node where a user is provided Internet access, the node will have means to insert (render) the aforementioned links into the webpage. Other means may be used as well, like, a program code (JAVA APPLET, JAVASCRIPT, ACTIVEX, etc.) may be used to interact with the web browser, and the web browser in turn will create a means (tab, bar, links, etc.) for the purpose of enabling the user means for viewing additional related content. Thus, the method includes configuring the server computer to render the first link reference on the client computer using programming code language selected from the group consisting of: JAVASCRIPT; JAVA APPLET; and, ACTIVEX.

The means for the user to access additional related content may be a bar that a user downloads and installs. For example, the bar may be downloaded from the Internet Service Provider, Index Server, or any other associated server to the Internet Service Provider. The bar may be user-downloaded or server-supplied (Internet Service Provider, Index Server, other server, etc.) as the user interacts with the Internet Service Provider. The bar may be a commonly used bar, one of those used frequently by all brands of browsers. Most of the time, the bar is static (fixed) at the top part of the web browser. It is typically next to, or just below, the browser's navigational bar. The bar may be floating as well, which would not depart from the true spirit of the teachings of this invention. The bar may a tab created by the web browser, such as for example, a tab created by the MOZILLA FIREFOX web browser.

I) Theory of Indexing Contents' Objects

A content page is comprised of objects (also referred to as contents). The objects are words, words within links, words within titles, words in bolds, words in underline, words in italics, name of images, invisible objects used by the web browser but not displayable to a user at the web browser, JAVA APPLETS, ACTIVEX, audio/video players embedded to the web page, etc.

An algorithm may be programmed in any conceivable way so as to index these contents. One commonly used way is to count the words of a content page based on the number of time they appear therein, and then set a threshold for the algorithm to choose target words for indexing. The threshold may be set to only index words that appear n-times in the page or higher, n-times or lower, the words that appear more often, less often, etc. If a word appears more often it will be a higher-choice candidate, if it appears less often, the same may be true, as well. Words appearing in bold, italics, underline, titles, images links, and links in general, may be assigned as higher-choice candidates as well. These choices will depend on how the algorithm's priority is set therefore.

The algorithm may be programmed to associate advertising or other content type to the displayed content based on one or more objects of a previously viewed content-page and the one or more object also appearing in the current displayed content page to the user.

The algorithm may be programmed to display advertising or other associated content type based on one or more objects of the previously viewed content that don't appear in the current displayed content page to the user.

The algorithm may be further be programmed to associate advertising or other content type based on one or more content objects that appear on the currently displayed content page to the user that is not part of a previously viewed content page by the user. The previously viewed content page may be from the current session or it may be from prior session and stored in any of the aforementioned storing devices, computer, wireless device, or any device that may be used for the purpose of storing information.

The indexed content may be online user-supplied contents, contents fetched from a Content Server (CS) over the Internet or contents fetched from the Internet Service Provider. The Index Server will have means to related the objects (e.g., words, links, etc) of the online user-supplied contents (e.g. advertisings) and the fetched contents, their relationship may include, but are not limited to: common words, similar words, partial matching words, full matching words, synonymous words, words having similar sound, etc. The same mechanism that is available to the Index Server is also available to the Internet Service Provider. The Internet Service Provider can have means for receiving user-supplied content online, parsing, indexing and relating them with other contents that are hosted by the Internet Service Provider or routed through the Internet Service Provider, as well.

II) The Theory of Internet Communication

FIG. 4 illustrates a server 400 (also referred to herein as a server computer), the Internet 402 and an optional wireless node 404, and a client computer 406. The Internet channel 402 is the communication channel between the client 406 and the server 400. The client 406 initiates a request for contents from server 400 and it returns contents thereafter. The Internet is the transport vehicle for transporting data between the two computers. Each computer of the illustrated arrangement, the server 400, the wireless node 404 and the client computer 406, each has an electronic processing unit 450 responsible for its functionalities. Thus, the method of the invention preferably includes steps of adapting the server computer to operate as a wireless node; and, configuring the wireless node to render the first link reference to the client computer.

The electronic processing unit 450 may or may not have all the components shown, or may have more components than those depicted thereon. In any case, each electronic processing unit 450 will have at least some basic electronic units like the CPU 460 and it is the brain of the electronic processing unit 450 responsible for all of the device's functionalities. At power up, the CPU 460 loads instructions from ROM 454 and the instructions will instruct the CPU 460 to load an Operating System (OS) from the storage unit 464 (it may be a magnetic disc, CD ROM, etc) into RAM 452. As needed, the electronic processing unit 450 will communicate with an outside environment through its I/O port 468 and in the case of the illustrated devices; this may be enabled by a network card that allows communication using the Internet.

The CPU 460 communicates differently with each connected electronic unit. In some cases, the communication and interaction is two-way and in other instances, one-way. As for the illustrated device 450 the CPU 460 implements one-way communication with the ROM 454 (one-way arrow 456) unit and two-way communication with all other devices as indicated by the two-way arrows (466, 462, 458 and 470). Each device may have input means as well, such as a mouse, keyboard, and other visual interfacing means like a screen, etc.

III) The Invention

FIG. 1 illustrates the Indexing Server (Index Server) 106, the Internet Service Provider 116, Internet contents 102 common to both servers, Index Server 106 which includes local contents 100, and the Internet Service Provider 116 which includes local contents 104. The Index Server 106 retrieves contents 102 and indexes them based on indexing rules previously mentioned, that is, the Index Server will index the contents' objects and save them into its database 110. As a user interacts with the Internet Service Provider server 116, the Internet Service Provider server 116 fetches and transmits to the user the same contents (others may be transmitted as well) to the user 124. If a wireless node 120 is present, the user 124 will receive contents 102 through Internet Service Provider 116, wireless node 120 and the link 122.

As indicated by the dotted lines, the wireless node 120 is optional, and it may or may not be present all of the time. Contents 102 are hosted by other servers on the Internet and accessed by the user 124 through the Internet Service Provider 116. Contents supplied by the Index Server 106 to the Internet Service Provider 116 and the Internet Service Provider 116 or to the user 124 may be contents that are online-user supplied (e.g., advertisements) to the Index Server 116, or, they may be contents 102 fetched from Content Servers (CS) over the Internet and indexed at the Index Server 106.

Index Server 106 and Internet Service Provider 116 are related 114 and they may exchange information, data, contents, etc. As the user interacts with the Internet Service Provider 116, the Internet Service Provider 116 may at any time save the user's interaction, such as for example, user surf history 132, or the contents 102 transmitted to the user. The Internet Service Provider 116 performs the same action as the Index Server 106 that is, indexing and saving them. Or, the Internet Service Provider 116 may send the user surf list 132 to the Index Server 106 and the Index Server 106 will fetch the contents 102 and index them for later use, if they are not yet indexed. The Internet Service Provider 116 may save the user surf list 132 in its database 108 as well, or just pass them to Index Server 106 along with user's profiling information 112 (128) and the Index Server 106 will do the indexation and saving. As illustrated the user profile 112 is present on the Internet Service Provider 116 but it may be present on Index Server 106 as well.

The user profiling information table 112 has three columns and the 1st column 113 represents the rows number for the table 112. The 2nd column 115 represents the ID's for table 112, and the 3rd column 117 represents the values for the ID's of column 115. For simplicity, only one table is illustrated for the user, as it is well known to those skilled in the art, in the real world, table 112 would most likely be divided into more than one table.

Table 112 has "Name" row #1 113, "Address" row #2 113, "City" row #3 113, "State" row #4 113, "Zip Code" row #5 113 and "income" row #6 113. The aforementioned rows are for the user profile. Rows #7 and #8 are for the user login credentials with Internet Service Provider 116. Rows #9-#11 illustrate the user's interaction with Internet Service Provider 116 and rows #12-#14 indicate the user's preset preferences.

The wireless node 120 is optional as indicated by the dotted lines and in case it is present, its demographic data may include, but is not limited to, its longitude and latitude location, address, city, zip code, street, ID, site ID, etc. (134), which may be used by the Internet Service Provider 116 or the Index Server 106 for providing contents to the user 124. The contents may be any kind of content that is geographical related, like but not limited to: shops in the surrounding area, accommodations, bars, SPAS, etc. The information may be in the form of advertisings, promotions, sales, maps, etc.

The topographic information of wireless 120 and user 124 may be used in conjunction or separately. If used separately, the user's 124 profile may be used to send contents (information) to the user concerning businesses, offers, events, etc. that are located in surrounding area of the wide are node 120. Such information may be based on similar contents located at the user 124 location (address) if the user is using a wireless node not located at the user's fixed address (128 and 112). The content may be content-related 129 to the user's previously viewed content 130 or content relevant to the wireless node's 120 location. Once again, the information (content) may be any type and in any form as well.

Figure 5:
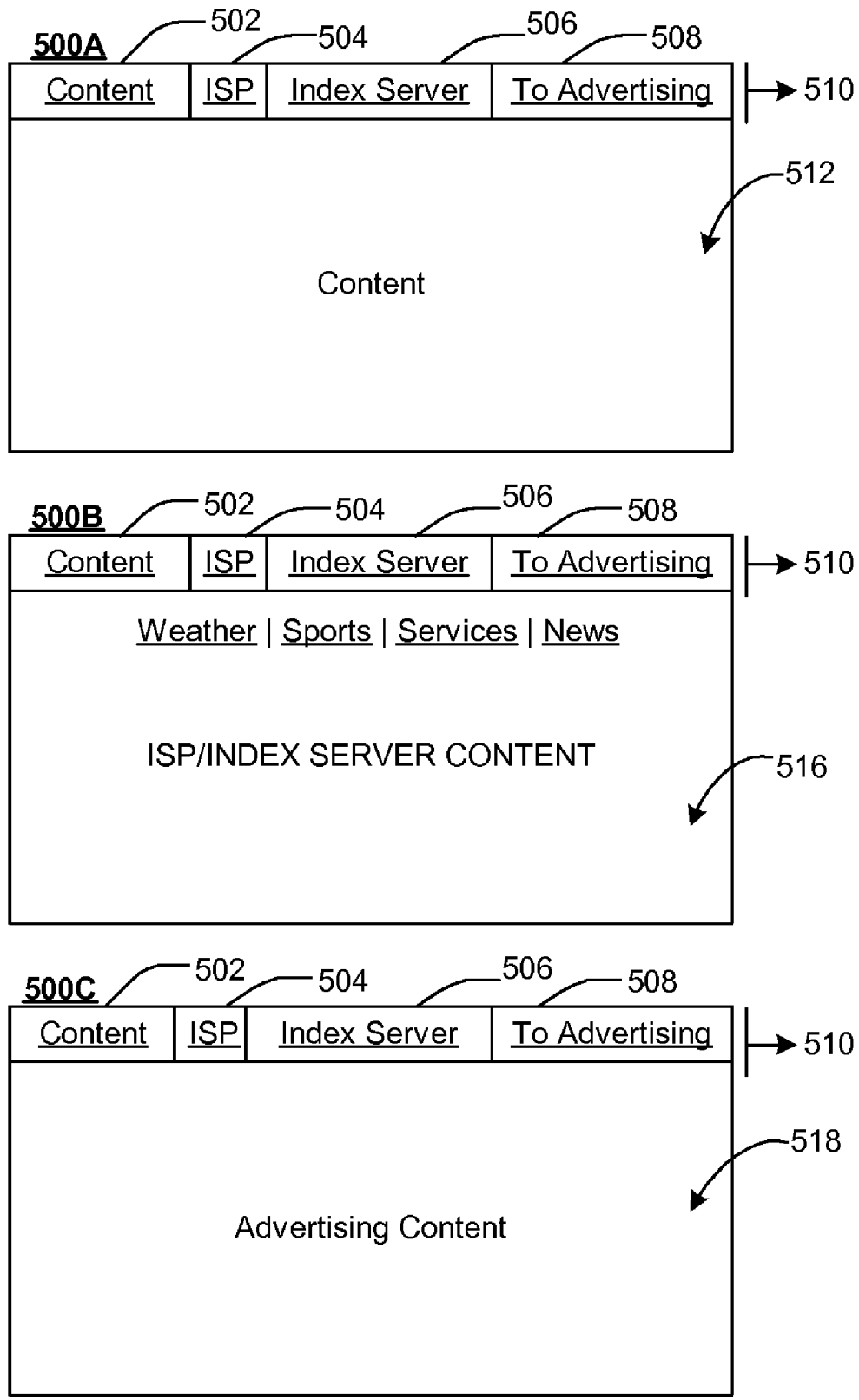
FIG. 5 illustrates linking means for interfacing a user to the Internet Service Provider and Indexing Server.

FIG. 5 illustrates three exemplary screens. The first one 500A illustrates one way to present contents to a user accessing the Internet Service Provider. Once a content page is received 500A with a "Content" displayed on content area 512, it is "Content" 102 of FIG. 1, and it is the content that the user received from the Internet through the Internet Service Provider server 116. The top part of the content page 500A illustrates a bar 510 with links. The bar 510 includes the link for the displayed "Content" 502. That link may be used once the user is viewing other contents (contents associated with the other links of the bar). If the user wants to return to the original content "Content" 512, link 504 will link to the Internet Service Provider 116 (FIG. 1) and receive contents, and it is the content illustrated on content area 516 of 500B, link 506 will link to Index Server (Index Server) 106 (FIG. 1), receive contents from it, then have them displayed on display area 516 of 500B, and a link for advertisements 508 will receive advertisements, and they will be displayed on screen area 518 500C. The bar 510 may be any kind of bar, floating bar, a tabs assigned by the Internet Service Provider to the web browser in the HTML (Hyper Text Markup Language) format, tabs assigned by the browser for the session, user downloaded bar, bar embedded to the web browser, etc.

The second exemplary screen 500B illustrates the same bar 510 and at this time the Internet Service Provider 504 or the Index Server 506 link was selected. Since either server may provide content to the user, and the content is displayed on screen area 516 of the web page, and as depicted, this content may be any kind of content. Finally, screen area 518 illustrates advertising content and it may be about shops, business, points of interests, etc., in the surrounding area where the user is accessing the Internet Service Provider. The information may be related to the wireless node's data, to the user's profile, contents/advertisements related to the user's previously viewed content, user's profile, user's surf history, etc.

Any of the aforementioned embodiments and methods may be used individually or in a group without departing from the true spirit of this invention. If these arrangements are used differently in conjunction with other arrangements that produce the same or close to the same end results, the objective of this invention is thus fulfilled. The user will have a variety of contents besides the contents accessed from the Internet through the Internet Service Provider, the contents will enhance the user's experience and the contents are related to the user interests, profiling, previously viewed contents, user/wireless node demography, etc.

The user profile may include user's hobby, users preferences like, but not limited to: sports category, movie category, clothing preferences, shoes preferences, etc., and once the user is accessing the Internet through the Internet Service Provider, advertisements and other contents will be available to the user. If the user is in a specific location and that location is near a sports shop having a special sale on bowling shoes and the user's hobby preference is bowling, then once the user is viewing the contents from the Internet Service Provider and the Internet Service Provider's uses the user's profiling and the wireless node's data (if the user is accessing the Internet Service Provider through the wireless node), then the bowling advertisements may be correlated to the user, since the user is in the surrounding area. The same is true regarding previously viewed contents, if the user has in the past, or in the current session, viewed a content page/website for bowling equipment or information of the like, the advertising will be targeted to the user as well. Also, once the user accesses the Internet Service Provider, the Internet Service Provider can track how long the user stays at each page or at each website and correlate this information with other data pertaining to the user, FIG. 1 table 112 rows #9-#11.

Figure 2:
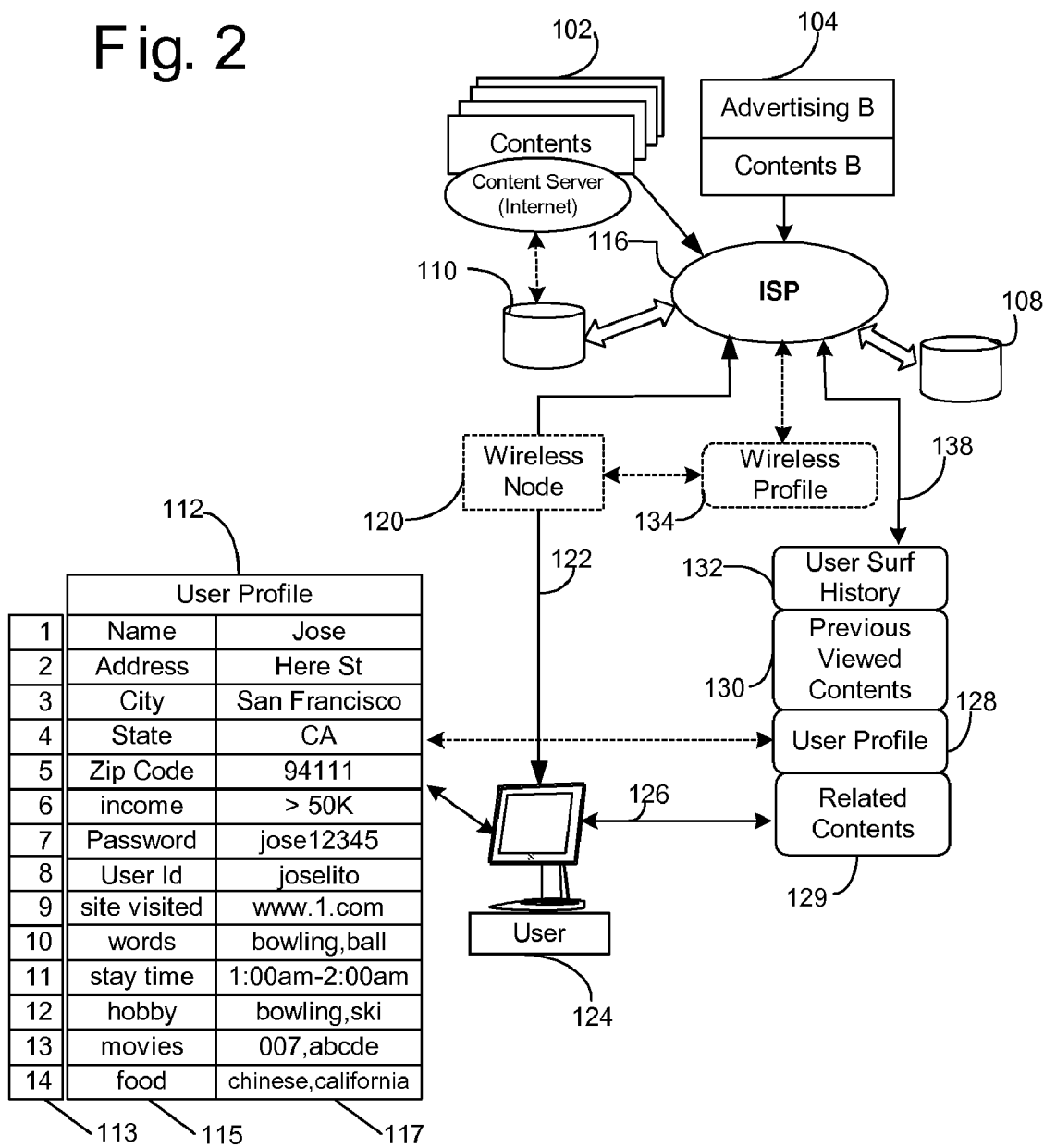
FIG. 2 illustrates another preferred embodiment of this invention in which an Internet Service Provider supplies content to a user.

FIG. 2 illustrates another embodiment using the arrangement illustrated in FIG. 1. All of FIG. 2's reference numbers are consistent with those in FIG. 1, except for the database 110, at FIG. 1. In FIG. 1, the database 110 is attached to Index Server 106, and in FIG. 2 it is attached to Internet Service Provider 116. Whereas FIG. 2 is based on Internet Service Provider 116 performing the contents' 102 indexing, in FIG. 1, Index Server 106 is performing the indexing. The difference between the arrangements of FIG. 1 and of FIG. 2 is that Index Server 106 has the ability to perform contents' 102 indexing before the contents are requested by a user and served to the user by the Internet Service Provider 116. In this arrangement, in most situations, the indexing is be done as the contents are requested, although, they may be indexed prior to a user's request. The remaining elements of the arrangement of FIG. 2 are parallel to those discussed above for FIG. 1.

There are many ways to implement this invention and the more we review its functionalities, the more modes of uses become apparent and its tremendous potential will be appreciated by those of the skill in the art.

FIG. 3 illustrates another embodiment, wherein contents 302 are transmitted to the user 310 through wireless node 306 connections 304 and 308. Others obvious elements like an Internet Service Provider server have been omitted. For example, it is apparent that some kind of server will be supplying the contents 302 to the user 310 through wireless/communication node (hence forth called node) 306.

FIG. 1 and FIG. 2 are premised on the Internet Service Provider server having means for supplying contents to the user, which is illustrated in FIG. 5. The user interacts with the related contents by selecting links in some kind of bar, tabs, floating bar, browser bar, etc.

As illustrated in FIG. 3, the same may be accomplished as well, by having the node to perform the same tasks that were performed by the Internet Service Provider. The node may have a computer attached to it as well, and the computer will act as an intermediary between the user 310, the node 306 (can part of the node or separated from it) and contents 302, parsing of contents and, as needed, saving the parsed contents therein.

The computer associated with node 306 will perform the functionalities that before were performed by the Internet Service Provider in the aforementioned arrangements. Once links 518 of FIG. 5, are clicked by a user, the user may be directed to one or more servers (312, 314 and 316) and information about the user visited contents, node's data and the user's preferences, etc., may be sent to the server(s), and one or more servers will be able to supply additional contents 320 directly to the user 310, or, through the node's server 306. The illustrated computer associated with the node 306 may be incorporated inside the node's electronic unit as well, without departing from the true spirit and teachings of this invention. A communication node may be any kind of a node between two computers; it may be a modem, a wireless node, a local area network, etc.

Wireless Node as an Active Device

The device may be programmed in many ways like by having a computer that is connected to the device send programming information to it, or have the device fetch the information from the computer that it is connected to, the computer that supplies the content information to the wireless node becomes a server. As well the server may be integrated into the device itself, or it may be a program that is downloaded and stored to the active wireless device node. Herein, the combination of the wireless device and the server may be referred to as a wireless device or a wireless node. If the combination includes the wireless server and the server computer it may also be referred to as a wireless-server or wireless-computer. If the meaning is intended to be any of the devices used in this disclosure or a combination thereof, the term wireless device(s) may be used.

In another embodiment of the present invention, more than one wireless device may act as an active device by transmitting contents to a variety of receiving devices where the receiving devices present the received content to the device's user. The content may be presented as a webpage or any other format means for a user interaction with the wireless-server or any other server that the content will redirect the user thereto.

In a further embodiment of the present invention, a wireless device transmits other information to the receiving devices that users at receiving devices may use as means to search devices based on the device's transmitted data. The transmitted data may be in the form of white data (data that the receiving devices use for the purpose of searching devices' content and may or may not display them the device's user). For instance, a first device transmits "today special great salads restaurant California Californian food" and a second device transmits "clothing men man children child women woman food restaurant." When the first device is located at a restaurant and the second device is located at a department store with a restaurant, and a user at a device initiates a search for "food restaurant," then the two devices would show up in the search result for the user.

In another embodiment of the present invention, a wireless device acts as an intermediary that goes in between two or more wireless devices, the intermediary device receives content from a wireless node and transmits the received content to the other wireless device connected therewith. Each wireless node or wireless device may act as content cache to cache content and make the cached content available to other devices. In the case of the wireless node, the cached content may be contents that the device receives from a hosting device at another location where the device is connected to the Internet/network. The wireless node (device to enable wireless communication) may become an actual active server and the same applies to the wireless receiving devices.

In another preferred embodiment, the wireless node enables free Internet connection or even paid wireless access to all by enabling the owner of the wireless-device node to offer free access and receive a commission of the generated revenues by the user accessing the wireless node. The commission may be based on clicks on advertisements that appear on the receiving device's page and clicked by the user. The commission may be based on advertising appearance (impression on the page), or on a sale of goods commission, for example, assuming that the user at the receiving wireless device is where the user is having free access. The commission may be based on a share of the commission paid by the manufacturer of the devices to others that want users to gain access through the owner of the wireless-device node.

The invention may be used to widen the exposure of goods or services to consumers who would participate in this free access arrangement. In the case of business involvement, the business may be an online store that offers a commission to all involved parties once a purchased is made by the user using free access. It is to be understood that many other methods of commission sharing may be used to achieve the same or similar end results. As well it may be that only the wireless device offering the free access participates in the income sharing, just the manufacture, just the Internet Service Provider, etc. It may be incorporated at the Internet Service Provider of this invention where the Internet Service Provider inserts the content, advertising, goods for sale, other services, etc. in this case the Internet Service Provider may give discount to the wireless device owner offering free access and the Internet Service Provider will participate on the profit sharing as well.

Figure 6:
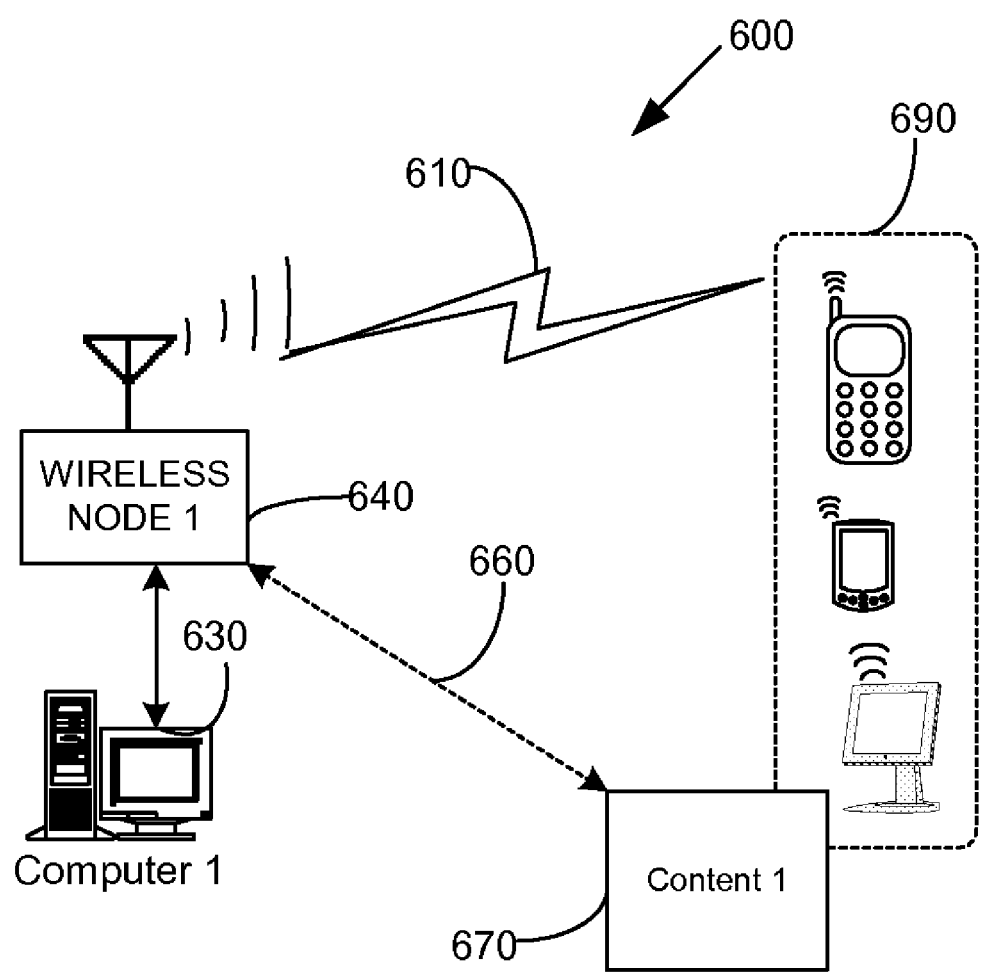
FIG. 6 illustrates a computer providing content to a wireless node and the wireless node providing content wireless devices, the computer acts as a host.

FIG. 6 illustrates an arrangement 600 where a wireless node 640 transmits signal 610 to various receiving devices 690 and a content page 670 is received from the wireless node 640. The received content page 670 may have been supplied by the computer 630 to the wireless device 640 or the wireless device 690 or the wireless node 640 may be the hosting devices instead of computer 630. Once a user accesses the "wireless node 1" 640 the user at any of the devices 690 will receive the "Content 1" 670 and it is supplied to "wireless node 1" 640 by "Computer 1" 630, "Computer 1" 630 is the host of "content 1" 670.

Figure 7:
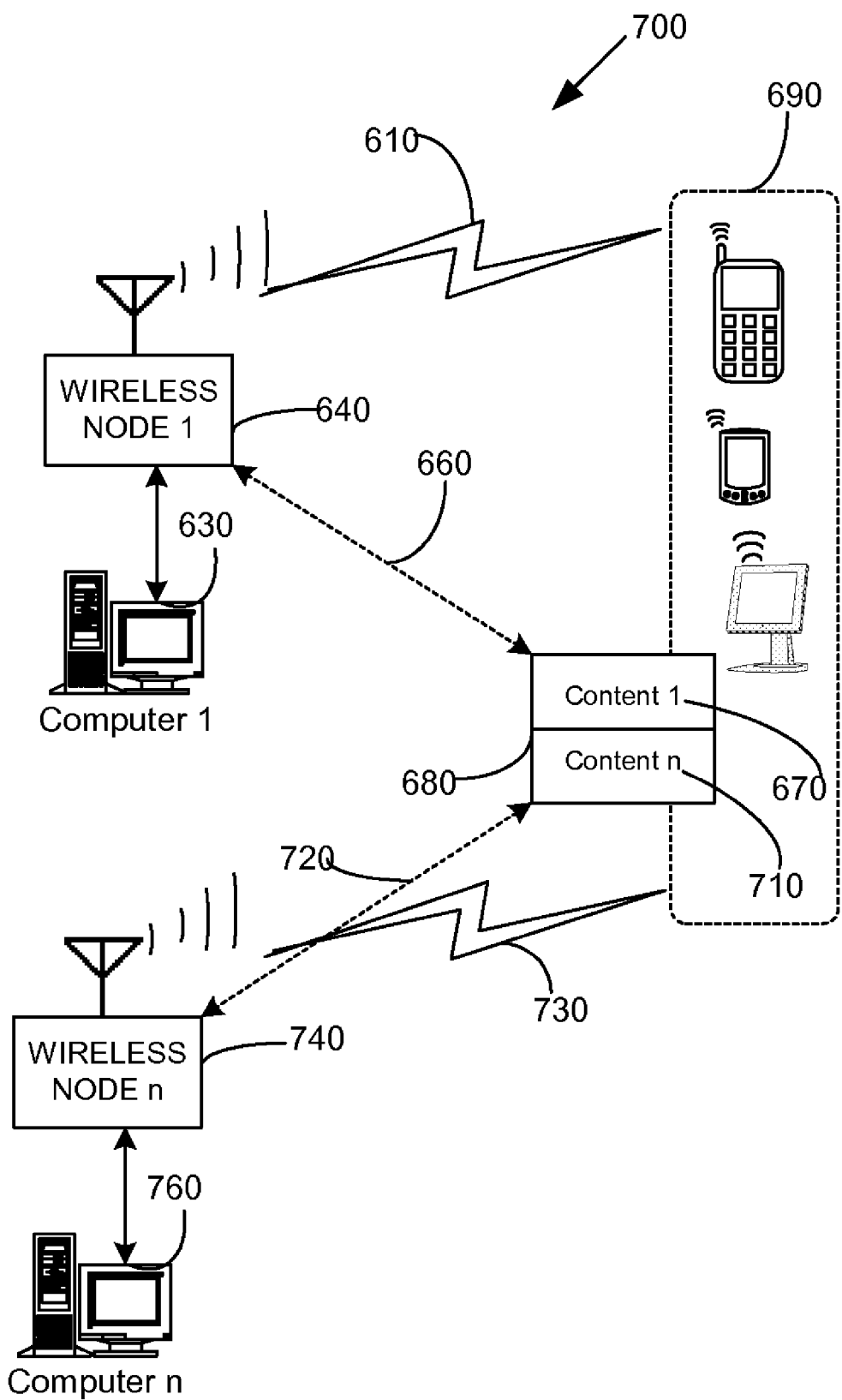
FIG. 7 is a further embodiment of FIG. 6 and it illustrates a plurality of wireless receivers receiving contents from a plurality of wireless-node-hosts.

FIG. 7 illustrates another embodiment of the arrangement shown in FIG. 6. A second wireless-computer "device n" 740 and computer 760 in the same arrangement as of the first wireless device-computer 630 and 640. The content page 680 has two contents "Content 1" 670 received from "Device 1" 640, and "Content n" 710 received from "Device n" 740. Only two wireless devices are shown in FIG. 7, but as it clear to the one of the skill in the art that any number of devices may be used without departing from the teachings of the present invention. As in FIG. 6, each of the two wireless nodes transmits a content to receiving device from the device group 690.

Figure 8:
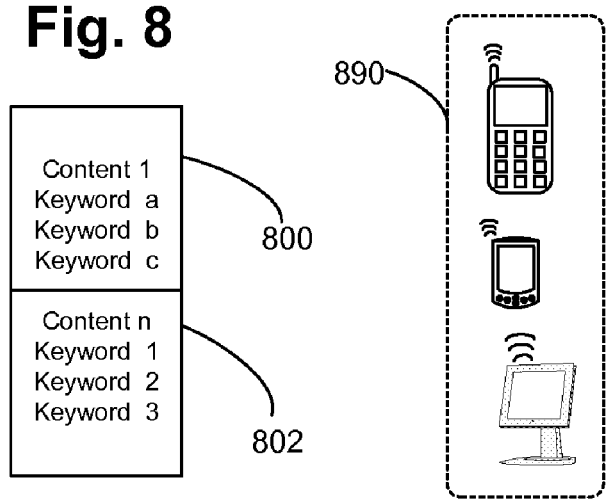
FIG. 8 is a further embodiment of FIG. 7 and it illustrates a plurality of wireless receivers receiving data/contents from a plurality of wireless-node-hosts.

FIG. 8 illustrates an alternative to the embodiment of FIG. 7 where two wireless devices (not shown) of FIG. 8 transmit data to the receiving client devices 890. "Content 1" 800 was received from "Device 1" 640 of FIG. 7 and "Content n" was received from "Device n" 740 of FIG. 7. "Content 1" 800 has the key words "Keyword a, Keyword b and Keyword c" and they may be part of the content or just data transmitted by the wireless device (white data), in any way, the receiving client device uses them to search for information that represents the wireless node 640 and 740 of FIG. 7. The same explanation applies to "Content n" 802. The wireless node can act as a server without departing from the teachings of the present invention; as well it can act as both a client and a content server computer or the computer may be part of the wireless device without departing from the true spirit of this invention.

As illustrated in FIG. 8, the hosting computers connected with the wireless-node devices enable a user to receive white data or any other data (displayable data to the user) where the user can search for contents/services in the general area. For instance, if the user is looking for a home to buy, the user will be able to see all the homes that are available and receive the information laid over on a map as illustrated by FIG. 9.

The present invention enables hosting and content searching very much like a search engine does. A user viewing the contents on these devices may interact with the content by touch screen, links, tabs, link on a bar, and icon on a bar, an icon on a tab or any other conceivable mean that is none these described herein that would perform the same functionality. Furthermore, the wireless-device receiver may receive data or information, which may include white data or displayable data from one or more wireless-device nodes. Data or information herein may be simply referred to as "data." The wireless-device receiver may send the received data to any of the aforementioned computer, server, or other device that will receive the data. The wireless-device receiver may associate one or more content to data, or offer other services to be displayed with the received data, or in addition to the received data.

Figure 9:
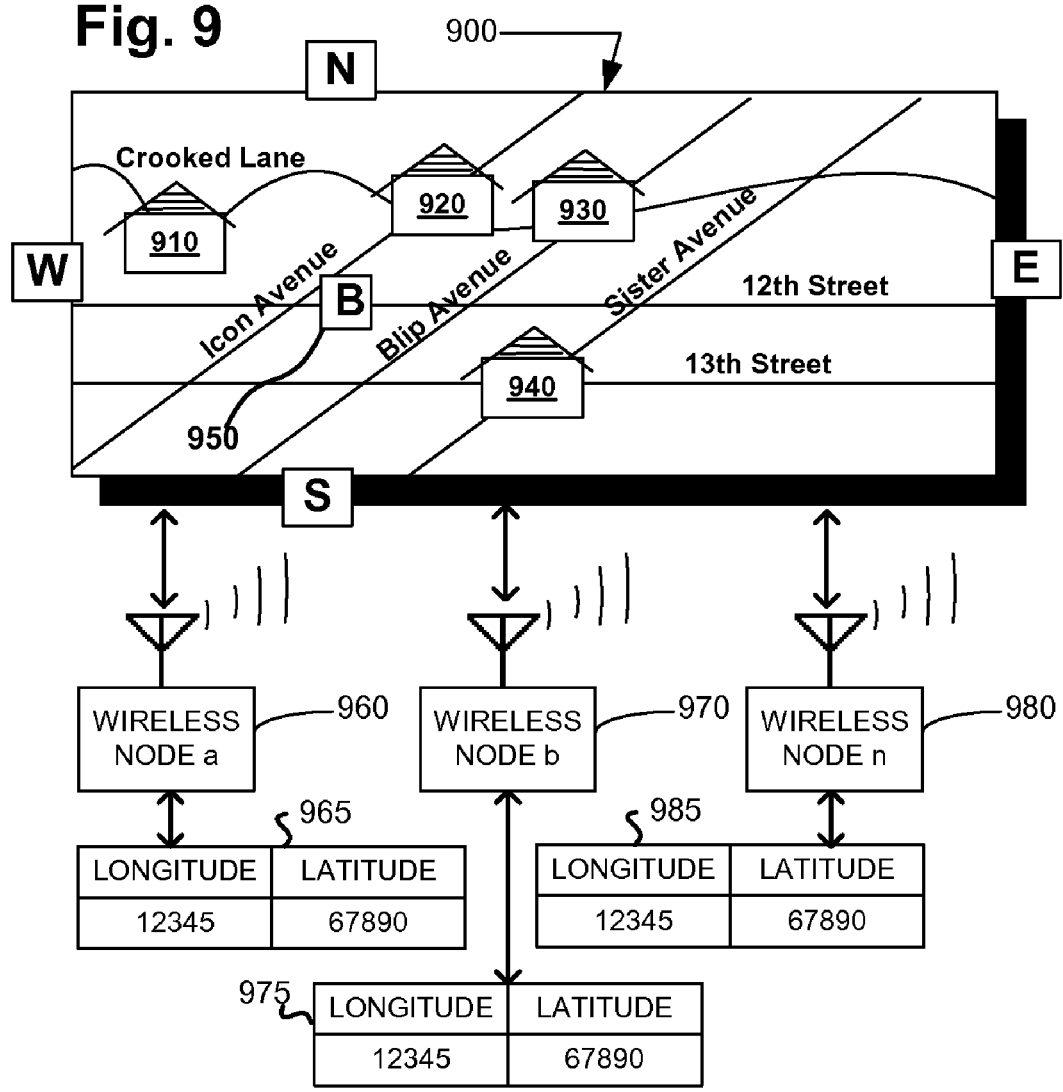
FIG. 9 illustrates the displaying of business and users on a map and based on the wireless-node-host longitude and latitude.

FIG. 9 illustrates another preferred embodiment of the present invention. A map 900 and three wireless nodes 960, 970 and 980 are shown. Each transmits a longitude and latitude data to the receiving device 950. Wireless "node n" 980 transmits its corresponding longitude and latitude pair 985, wireless node 970 transmits its corresponding longitude and latitude pair 975, and wireless node 960 transmits its corresponding longitude and latitude pair 965.

The receiving device 950 associates the corresponding longitude and latitude pair to a geographical position on the map 900 and the wireless nodes are geographically located in the surrounding topographical area in relation to the receiving device 950. The wireless nodes are displayed over the map as business 910, 920 and 940.

Figure 10:
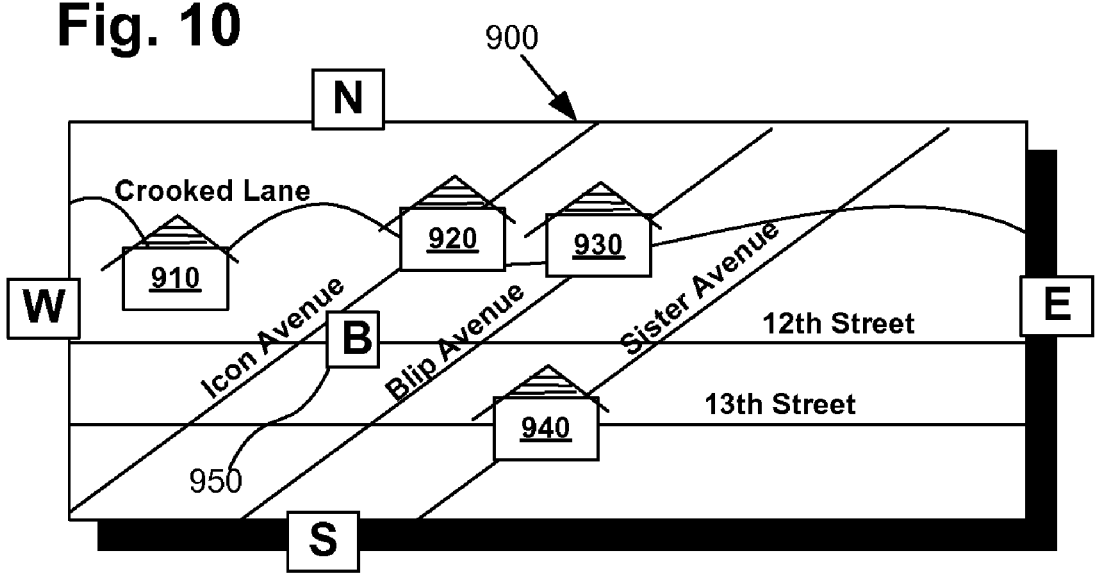
FIG. 10 is a further embodiment of FIG. 9 and it illustrates a user search of the wireless-node-host devices with directions of the businesses displayed on the map.

FIG. 10 is a further embodiment of FIG. 9 and it illustrates the same map 900 of FIG. 9 and instructions 1060 for the user 950 to locate business 920, likewise, information 1070 is used by user 960 (not shown on the map) to located business 930.

Figure 11:
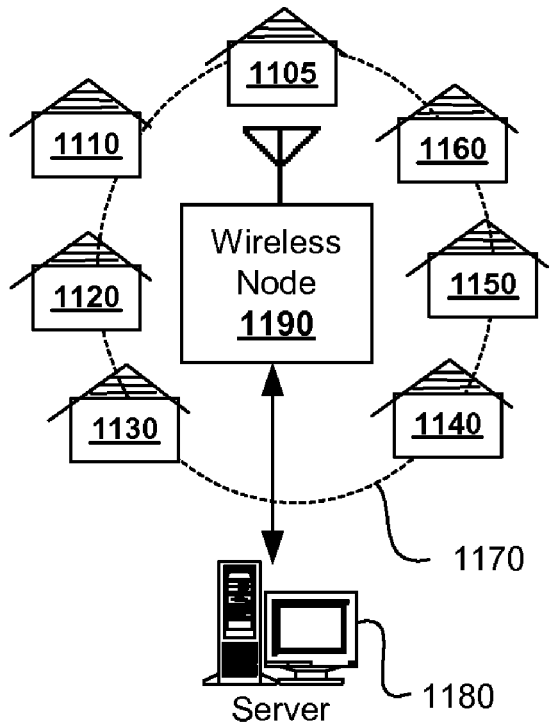
FIG. 11 illustrates a wireless node and surrounding business.

FIG. 11 illustrates another embodiment of the present invention where a wireless node 1190 is connected to a server 1180. Such connection may be through the Internet/Network. Server 1180 or wireless device 1190 has longitude and latitude of businesses in the surround geographical area of the node 1190 and they are businesses 1105, 1110, 1120, 1130, 1140, 1150 and 1160. Then server/node transmits the businesses longitude and latitude data of the business 1170 that are close to the node 1190 and the node broadcast them to connected devices and the devices can display them in any conceivable way including the method of laying them out over a map as has already been explained elsewhere in this disclosure.

Figure 12:
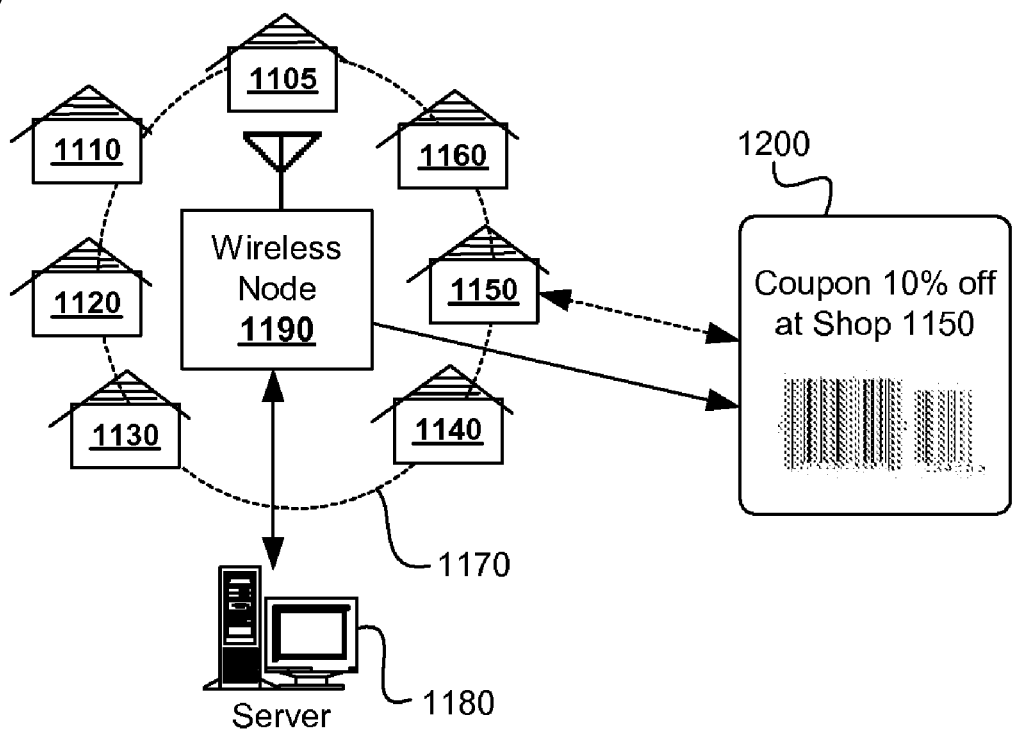
FIG. 12 illustrates the user of barcode-coupon by business using the wireless node.

FIG. 12 is a further embodiment of FIG. 11 and it includes coupon 1200 that may be used at shops in the surrounding geographical area of the wireless node. In this particular exemplary explanation, the coupon 1200 is for business 1150. We've illustrated coupons but it may be any kind of promotional targeted to businesses in the surrounding area of a wireless node device. As well, the coupon or the promotional content may include a bar code where the business establishment can scan to facilitate its processing. The coupon may be printable or may be displayable on the receiving devices and be scanned by any scanning equipment direct from the device's screen.

This invention may be setup to compensate the wireless device's owner where once a user clicks on an advertisement that is associated with the node, the wireless device's owner earns a commission for the user's click; the same may be done for goods or services (accommodation, SPA visit, restaurant visit, etc.) sold to users through the wireless device, that is, to compensate the wireless device's owner with a commission for the sale.

In another preferred embodiment of the present invention, the wireless node may be used to allow the user access to limited sites associated with an entity supporter of the wireless node—provider of content to the wireless node—or to be set by the wireless node's owner. For instance, the participating parties making use of the wireless node may compensate the wireless node's owner for allowing users to use its node by receiving advertising clicks, sales of goods commission, etc.

This way free Internet for all may be accomplished by having the wireless nodes providing free access to all and receiving commission for the access they provide. As well, it may be setup that wireless nodes' manufacturers receive a small commission as well for the devices they sell to the public, in such an arrangement, the wireless node manufacturer may sell the device for a very low cost or may provide it free of charge for anyone who participates in the initiative of providing free Internet access for all.

Figure 13:
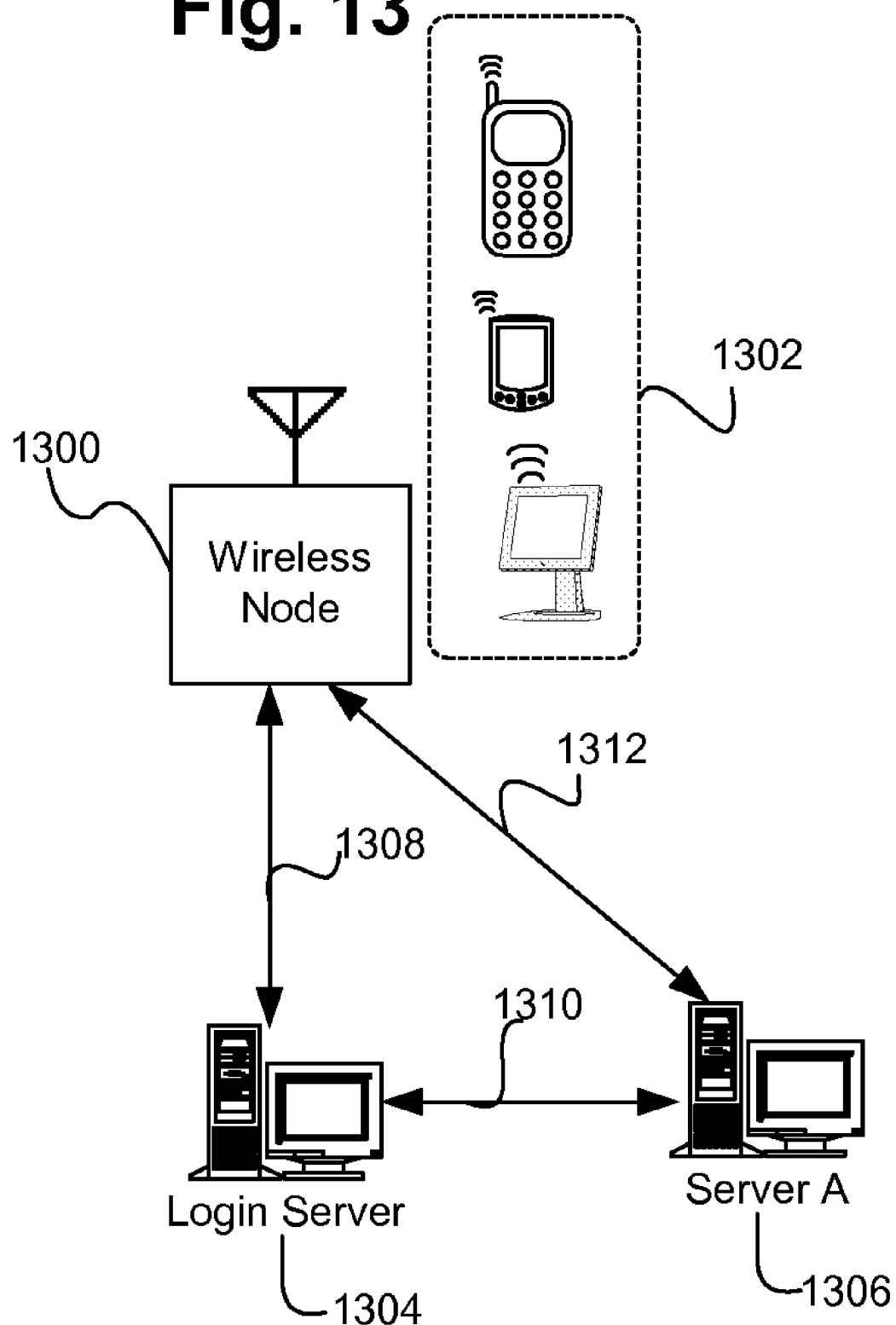
FIG. 13 illustrates an arrangement for devices accessing the wireless node and performing a login.

FIG. 13 illustrates how to offer free Internet access to others, it is important to notice that this is a mere illustration and other mechanism may be used as well without departing from the true spirit of the invention, it may be used in unison with other elements of the present invention where this method may be incorporated by the Internet Service Provider server, Indexing server, the wireless node, at the wireless receiver, etc.

FIG. 13 illustrates a group of devices 1302 accessing wireless-node device 1300 and having it communicating with a login server 1304 and it is used for the users at devices 1302 to login. The users at devices 1302 may be registered with the login server 1304, it may be setup where users don't have to be registered and logged in as well without departing from the true spirit of the invention. The login server 1340 may also be used as verifier of other sites, servers, affiliation as to allow or deny them user access through the wireless node.

After a user gains access and moves to another site/server the wireless node will once again contact the login server 1304 to be sure that the site is affiliated. For example, a user at one of the devices 1302 after visiting site/server 1304 moves to "Server A" 1306. Before the wireless node 1300 redirects the user to "Server A" 1306, it will contact "Login Server" 1304 passing the new URL (Universal Resource Locator)—arrow line 1308—to the Login Server 1304. After the "Login Server" 1304 verifies the association, it will return acknowledgement back to wireless node 1300, which is positive if the new server at the new URL is associated, or otherwise negative.

If the acknowledgement is positive the wireless node 1300 will allow the user to be redirected to the new location—arrow line 1312—"Server A" 1306. "Server A" 1306 may communicate with the "Login Server" 1304—arrow line 1310—as needed to receive contents or other information to be supplied to the user through the wireless node 1300, contents like advertising, goods for sale, services, etc. The embodiment may be setup as to allow the "Login Server" 1304 to contact "Server A" 1306 as well and retrieve contents from server 1306 and supply them to wireless node 1300 without departing from the true spirit and scope of this invention.

Figure 14:
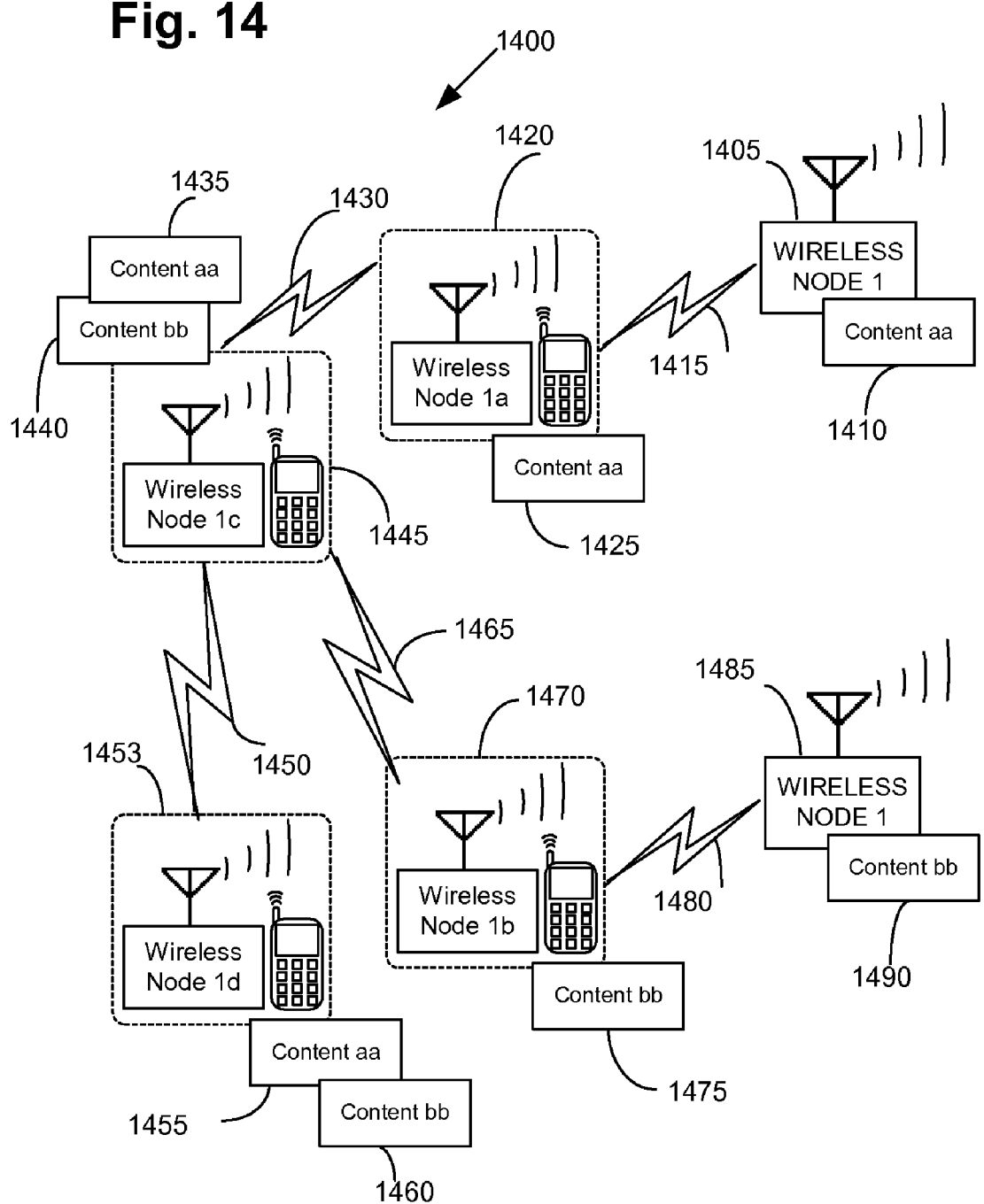
FIG. 14 illustrates wireless nodes used as signal repeaters.

FIG. 14 it is another preferred embodiment of the present invention where a wireless receiver acts as a receiver and transmitter where one or more wirelesses receive content from wirelesses nodes and the receiving wireless device becomes a transmitter to other wireless devices that are out of range from the wireless node. The objective is to have the wireless node's content to be available to more wireless receivers, thus offering a longer range to the wireless node that otherwise it would.

Wireless node 1405 (the server is not included for clarity or it may be part of the device) hosts "content aa" 1410 and is available to wireless receiver 1420 as content 1425 and once device 1420 receives the content 1425 and device 1420 can make use of it as usual or make it available to other devices through a wireless connection. In the present illustration device 1445 receives content 1425 from device 1420 through wireless connection 1430 and it is content 1435. As illustrated, the wireless node is incorporated into devices 1420, 1445, 1453 and 1470.

Device 1485 hosts content 1490 and device 1470 receives content through wireless connection 1480 and it is "content bb" 1475 and the same is made available to device 1445 through wireless connection 1465; it is "content bb" 1440.

Device 1445 has two contents, "Content aa" 1435 that was received from wireless device 1420 and "Content bb" 1440 that was received from wireless device 1470. It important to notice that once a wireless device receives content it not only will act as receiver transmitter of the content, it as well may act as a cache (save content for a period of time or permanently) that will save the content as need and make them available to other devices even after the device has moved away from the wireless device where the contend originated.

Device 1453 is located a distance away from either wireless node 1485 or wireless node 1405, wireless receiver 1453 is making use (consuming) "Content aa" 1455 and "Content bb" 1460, and both were retrieve from device 1445 through wireless connection 1450. Once a device receives the content, it can save it (cache) for later use or just simply act as transmission wireless link between devices. In the latter instance, devices 1420 and 1470 may simply become a link between wireless nodes 1405 and 1485 and wireless device 1445. The same is true for device 1453 where device 1445 may simply be an intermediary to device 1453.

Once contents are cached at a device they may follow any rules that any caching mechanism follows like keeping the content permanently or disposing them (deleting from the cache) based on predetermined time span, like minutes, hours, days, months, years, etc., or based on the content(s) usability to other devices, like, keep the cache alive as long as other devices are connected and consuming the content(s) or saving portion of the content, the content's keywords, the URL (Universal Resource Locator) where the content originated, etc.

The present invention has been explained and the term object, word or keyword has been used throughout, it is to be understood that object is an appropriate term and the object may be an image, word, title, link, it may be in a hidden field like a comment, form element, word in bold, word in italics, words underlined, keyword embedded in the contents' body, etc.

Although the present invention and its advantages have been described in detail, it should be understood that various changes, substitutions and alterations could be made herein without departing from the true spirit and scope of the invention as defined by the appended claims. Moreover, the scope of the present application is not intended to be limited to the particular embodiments of the process, machine, manufacture, composition of matter, means, methods, computer software and steps described in the specification.

As one of ordinary skill in the art will readily appreciate from the disclosure of the present invention, processes, machines, manufacture, compositions of matter, means, methods, computer software, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, computer software or steps.

INDUSTRIAL APPLICABILITY

The invention has application to the advertising industry.

What is claimed is:

1. A method of controlling the display of information on a client computer operated by a user, the method implemented by a server computer and comprising the steps of:

hosting a first content on the server computer, the first content comprising material that can be parsed into a plurality of objects, said objects selected from the group consisting of:
  a word the word comprising: a word within a link, a word within a title, a bolded word, an underlined word, and an italicized word;
  a name of an image;
  an invisible object used by a web browser, but not displayable to a user of the web browser;
  coding embedded in a web page; and
  an audio/video player embedded in a web page;
indexing the plurality of objects, said indexing performed by the server computer;
identifying a second content that is related to the first content, said identifying performed by the server computer using an object in the plurality of objects;
enabling the client computer to access the server computer;
creating a first link reference to the second content;
formatting the first content and the first link reference for display on the client computer wherein said formatting displays the first link reference in a:
  link display area that is separated from the first content that will display in a content display area;
  style that is indicative that other additional related content is available to the user;
  configuration selected from the group consisting of a tab; a link; a bar; a floating bar; a browser bar; a user downloaded bar; and a menu;
transmitting the first content that was formatted and the first link reference to the client computer;
responding to user interaction with the first link reference by:
  sending the second content to replace the first content on the client computer; the second content comprising a second link reference; and,
redirecting the user to the hosting location of the second content when the user clicks on the second link reference.

2. The method of claim 1 further comprising the step of configuring the server computer to render the first link reference on the client computer using programming code language selected from the group consisting of: JAVASCRIPT; JAVA APPLET; and, ACTIVEX.

3. The method of claim 1 further comprising:
  adapting the server computer to operate as a wireless node, the wireless node selecting additional content to send to the user based on location of the user; and,
  configuring the wireless node to render the first link reference to the client computer.

4. The method according to claim 1, wherein
the second content is related to the first content based on the second content having a relationship with the first content, said relationship selected from the group consisting of: a previously viewed content; a common word between the first and the second content; a user preference; a common category between the first and the second content; user personal information; user profiling information; location information; surf history; user hobby; user address information; a similar word between the first and the second content; a partial matching word between the first and the second content; a full matching word between the first and the second content; a synonymous word between the first and the second content; a homophone of the first content; an advertisement containing any of the key words or objects; commonality with a user-supplied content having a relationship with the first content; and, a defined interest of the user.

5. The method of claim 1 further comprising the step of configuring the server computer to connect to a wireless node.

6. The method of claim 1 further comprising the step of integrating the server computer and a wireless node into a single unit.

* * * * *